United States Patent Office 2,796,107
Patented June 18, 1957

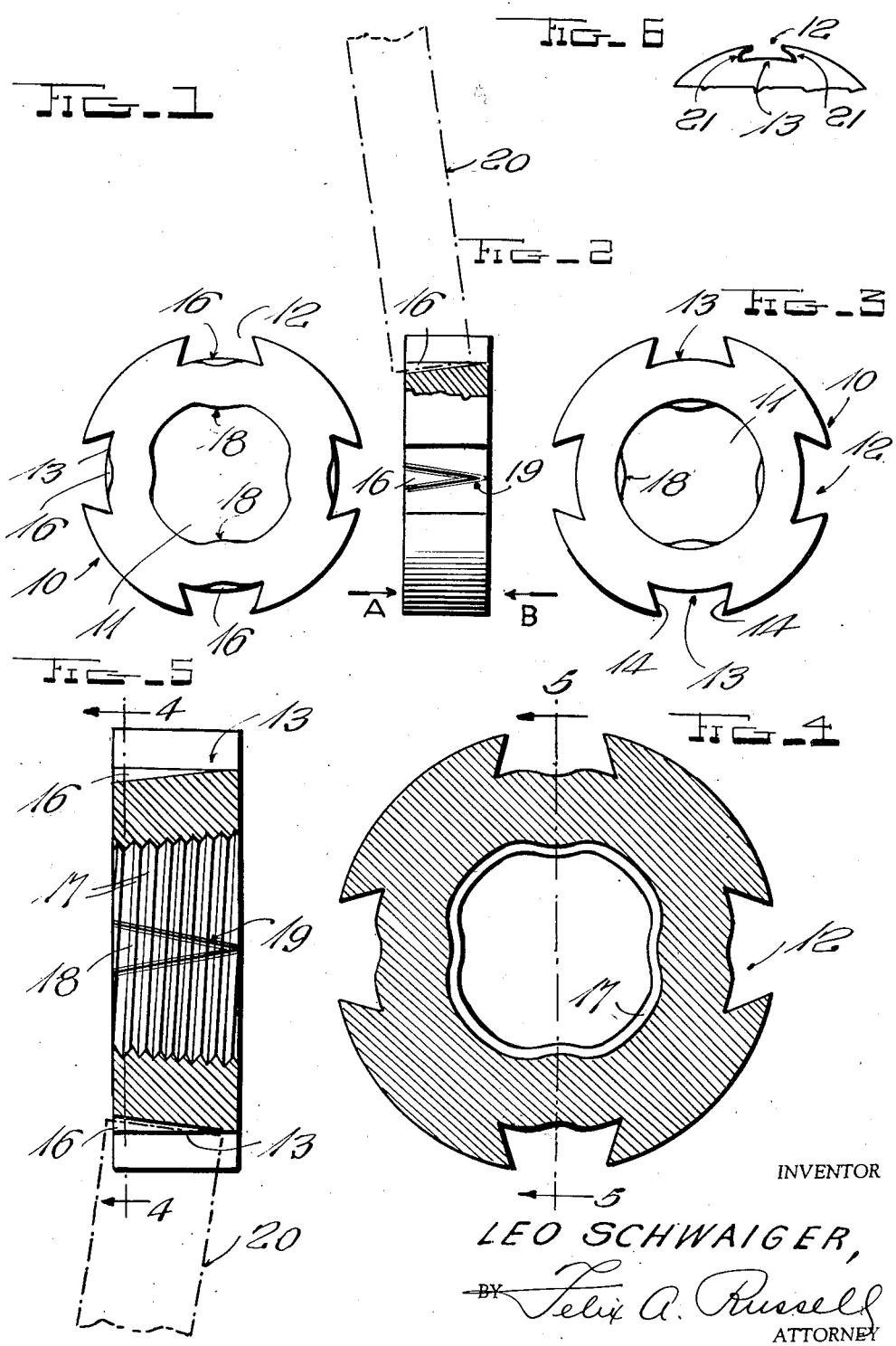

2,796,107

RADIALLY DEFORMED LOCKNUT

Leo Schwaiger, Cullman, Ala.

Application November 13, 1952, Serial No. 320,208

2 Claims. (Cl. 151—21)

The present invention relates to self-locking nuts and more particularly to nuts of this character which are deformed to provide a self-locking action.

An object of the invention is to provide a self-locking nut which may be originally manufactured to include a certain amount of deformation to provide self-locking action, which deformation may conveniently be increased in the field by the use of simple tools.

A further object of the invention is to provide a nut of this character in which the deformation thereof does not interfere with the surfaces of the nut which are engaged by a wrench.

Another object of the invention is to provide a nut of regular peripheral configuration having inwardly extending generally trapezoidal peripheral apertures formed therein, each trapezoid being open at its shorter base, the longer base of the trapezoid being an arc of a circle concentric with the center of the nut. The sides of the trapezoid diverge toward the center of the nut, and the sides may be of arcuate shape, if desired.

Another object of the invention is to provide a self-locking nut of this character in which the internal threaded surface is deformed to obtain the locking action, the amount of such deformation increasing progressively throughout the thickness of the nut, and thus progressively increasing the amount of locking action produced by the deformation of the threads as the nut is threaded on to a bolt, or the like.

A further object of the invention is to provide a nut of this character in which the deformation producing the self-locking action is made at the bottom of the peripheral trapezoidal apertures in the nut where it will have no adverse effect when it is desired to turn the nut by the use of a suitable wrench.

Other and further objects of the invention will become apparent from a reading of the following specification taken in conjunction with the drawing, in which:

Figure 1 is an end view in elevation of a nut embodying the invention, viewed in the direction of the arrow "A" in Figure 2, Figure 2 is a side elevational view of the embodiment shown in Figure 1.

Figure 3 is an end elevational view similar to Figure 1 viewed in the direction of arrow "B" in Figure 2, Figure 4 is an end sectional view in elevation taken along the line 4—4 of Figure 5, looking in the direction of the arrows, Figure 5 is a side sectional view in elevation taken along line 5—5 of Figure 4, looking in the direction of the arrows, and Figure 6 is a fragmentary end elevational view illustrating a modified form of peripheral aperture which may be used in carrying out the invention.

Referring to Figure 1, there is shown a nut designated generally at 10 having a centrally internally threaded aperture 11 and a plurality of inwardly extending peripheral apertures 12, each peripheral aperture 12 being generally trapezoidal in shape. The longer base of each trapezoid is an arcuate surface 13 which is concentric with the threaded aperture 11 of the nut 10. The sides 14 of each trapezoidal aperture 12 diverge toward the center of the nut 10. The nut 10 is shown as being of circular peripheral configuration, but it may take some other form, such as a regular polygon, for example, the trapezoidal apertures 12 being centrally disposed with respect to the sides thereof.

Each of the arcuate surfaces 13 at the bottom of the trapezoidal apertures 12 has been deformed in order to obtain the desiraed self-locking action. This operation may be performed by swaging in a press, or it may be performed with a suitable chisel or similar tool struck with a hammer. The amount of deformation, as shown in Figures 1, 3 and 4, is greatly exaggerated for purposes of illustration.

The swaging pressure is applied to each of a plurality of V-shaped areas 16 (Figure 2) and the shape of the depression formed is similarly of generally V-shaped cross-section becoming progressively smaller progressing toward the apex of the first-named V. The apices of the V's are all directed toward and are adjacent to the same side of the nut. This deformation presses the threads 17 in aperture 11 inwardly over a correspondingly V-shaped area, the maximum amount of thread deformation being in the area 18 (Figure 5) beneath the spread portion of the arms of the V-shaped area 16 and the minimum amount of thread deformation is at 19 beneath the apex of the V.

As the nut is threaded on to a bolt, or the like, the area of minimum thread deformation 19 is originally presented to the end thereof and as the nut is threaded further thereon, the threads become tighter as the area of maximum thread deformation 18 is reached. This may require the use of a wrench to turn the nut at all. If the nut is too loose, the degree of tightness may be increased by the use of a tool such as a chisel 20 shown in dotted lines in Figures 2 and 5 so that the amount of deformation is thereby increased. If the nut is frequently removed and replaced the deformation may be conveniently restored in this manner to compensate for wear.

Figure 6 is a modified form of the invention in which the sides 21 of the trapezoidal aperture 12 are arcuate in shape, being concavely directed generally toward the bottom arcuate surface 13 of the aperture 12. This may require the use of a modified form of wrench.

While but one form of the invention has been shown and described herein, it will be readily apparent to those skilled in the art that many minor modifications may be made without departing from the spirit of the invention or the scope of the appended claims.

What is claimed is:

1. A nut of the character described having a regularly shaped peripheral configuration and a plurality of circumferentially spaced inwardly extending wrench-receiving apertures therein and having a centrally disposed threaded opening therethrough, said threads being deformed inwardly at areas located radially inwardly from each of said apertures for obtaining self-locking action, said apertures each having a depressed area in the inner end thereof corresponding to said areas of deformation of said threads, said areas each being V-shaped and extending substantially throughout the length of said threaded opening, the apices of all of said V's directed toward the same side of said nut, and wherein the amount of said deformation is a minimum at the apex of each V.

2. A nut of the character described having a regularly shaped peripheral configuration and a plurality of circumferentially spaced weakened portions therein and having a centrally disposed threaded opening therethrough, said threads being deformed inwardly at areas located radially inwardly from each of said weakened portions for obtaining self-locking action, said weakened portions each having a depressed area in the inner end thereof corresponding to said areas of deformation of said threads, said areas each being V-shaped and extending substantially throughout the length of said threaded opening, the apices of all of said V's directed toward the same side of said nut, and wherein the amount of said deformation is a minimum at the apex of each V.

References Cited in the file of this patent

UNITED STATES PATENTS

| | | |
|---|---|---|
| 1,083,217 | McClellan | Dec. 30, 1913 |
| 1,464,406 | Butler | Aug. 7, 1923 |
| 1,903,921 | Rupf | Apr. 18, 1933 |